Dec. 8, 1925.
H. F. SCRUBY ET AL
CLUTCH
Filed May 7, 1923
1,564,717
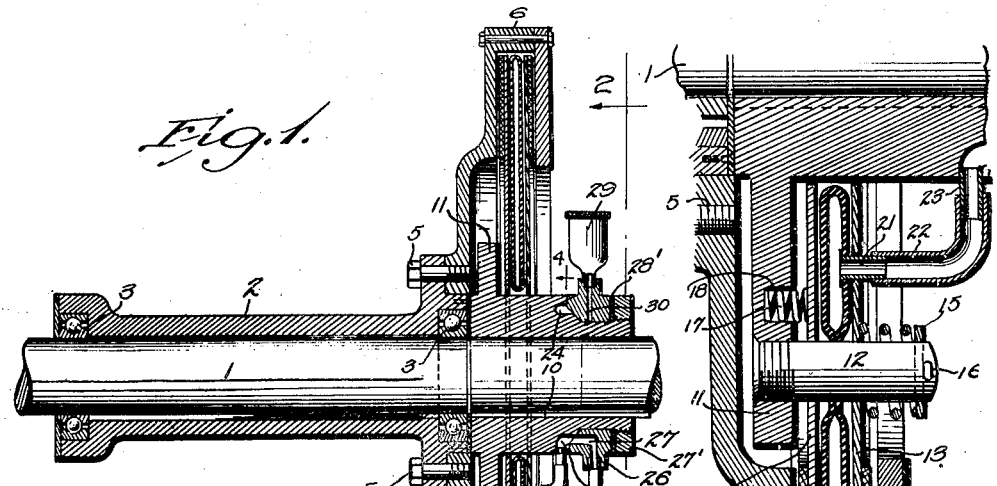
Fig. 1.
Fig. 2.
Fig. 3.
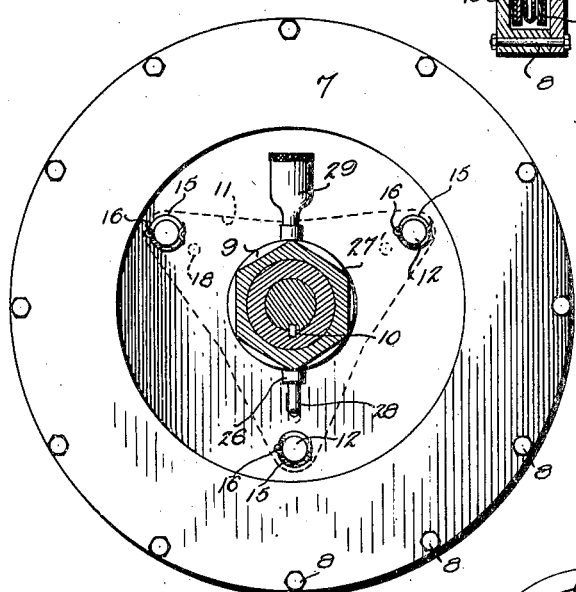
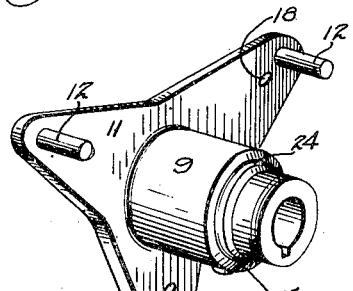
Fig. 5.
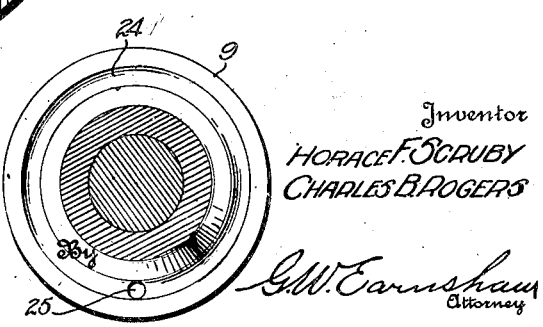
Fig. 4.
Inventor
HORACE F. SCRUBY
CHARLES B. ROGERS
G. W. Earnshaw
Attorney Patented Dec. 8, 1925.

1,564,717

UNITED STATES PATENT OFFICE.

HORACE F. SCRUBY, OF MIAMI, OKLAHOMA, AND CHARLES B. ROGERS, OF JOPLIN, MISSOURI.

CLUTCH.

Application filed May 7, 1923. Serial No. 637,295.

*To all whom it may concern:*

Be it known that we, HORACE F. SCRUBY and CHARLES B. ROGERS, citizens of the United States, residing at Miami, in the county of Ottawa and State of Oklahoma, and Joplin, in the county of Jasper and State of Missouri, respectively, have invented certain new and useful Improvements in Clutches, of which the following is a specification.

This invention relates to clutches, and more particularly to pneumatic clutches.

An object of the invention is the provision of a pneumatic clutch particularly adapted for engine and line shafts and other heavy work.

A further object is to provide a pneumatic clutch having a receptacle for air or other fluid that is independent of the other parts of the clutch and may be readily replaced with slight loss of time and at small expense.

In the accompanying drawings, we have shown one embodiment of the invention. In this showing:

Figure 1 is a central longitudinal sectional view through the clutch,

Figure 2 is a transverse sectional view on line 2—2 of Figure 1,

Figure 3 is an enlarged sectional view of a part of the clutch taken on substantially the same line as Figure 1, Figure 4 is a detail transverse sectional view on line 4—4 of Figure 1, and, Figure 5 is a detail view of the hub or driven member.

Referring to the drawings, the reference numeral 1 designates a shaft to be driven. A quill 2 is loosely mounted on the shaft and is connected to a suitable source of power by any desired means (not shown). As shown, roller bearings 3 are provided at each end of the quill. A casing 4 is connected to the quill by bolts 5 and this casing is provided with a peripheral flange 6. A ring 7 is secured to the flange by means of bolts 8. This ring is parallel to a portion of the casing and the inner faces of the ring and casing form the clutch facings. These faces are machined to a smooth finish and serve as friction surfaces.

A hub 9 is secured to the shaft by a key 10 to revolve therewith. This hub is provided with a substantially triangular shaped plate 11, having pins 12 projecting therefrom parallel to the axis of the hub. A pair of disks 13 are mounted on these pins, the disks being provided with central openings for the passage of the shaft. The outer ends of the pins are provided with springs 14 which bear against the outer face of one of the disks. As shown, the springs are retained on the pins by washers 15 and cotter pins 16. The outer face of the other disk is engaged by a series of springs 17, arranged in recesses 18 in the hub. These disks are provided with friction linings 19 of cork or other suitable material which are adapted to engage the machined surfaces of the casing and ring when the disks are forced outwardly. They are normally retained disengaged by means of springs 14 and 17. An air bag 20 is arranged between the disks. The air bag extends entirely around the hub and is provided with suitable openings for the pins 12. A nipple 21 is connected to the air bag and a suitable piece of tubing 22 extends from this nipple to a similar nipple 23, communicating with a groove 24, in the hub. As shown, the groove extends entirely around the hub, (see Figure 4) and communicates with the nipple 23 through a passage 25. A ring 26 is arranged on the hub. This ring is stationary at all times and does not revolve with the hub. It is provided with a passage 27 communicating with the groove 24 and with an inlet pipe 28. The face of the ring adjacent the groove is ground to form an air-tight fit. The ring is retained in position by means of a lock nut 27', and a spring washer 28'. This permits adjustment of the ring to take up wear, if necessary. The hub is provided with lubrication from a cup 29, carried by the ring and a passage 30 extending through the ring.

In operation, the quill 2 is driven from any suitable source of power and revolves freely on the shaft 1. When the clutch is disengaged, the hub and shaft are stationary. To engage the clutch, air or other fluid is admitted through the pipe 28 by means of a suitable control valve (not shown) and passes through the passage 27 of the groove 24. As this groove extends entirely around the hub, a portion of it is always in communication with the passage 27. The fluid then passes through the conduit 22 to the air bag 20, filling the bag and forcing the disks outwardly against the tension of the springs 14 and 17. This causes the friction members 19 to engage the inner surface of the casing 4 and the ring 7, thus forming a friction connection between the driving member and the hub. As the hub is keyed to the shaft, the shaft revolves with it when the clutch is engaged. To disengage the clutch, the fluid is exhausted from the bag by opening the valve. The springs normally retain the clutch in disengaged position and balance them so that there will be no tendency to wobble on the pins. In normal position, there is just sufficient clearance between the linings 19 and the friction surfaces of the casing and ring to allow the casing and ring to revolve without touching the disks.

It is to be understood that the form of the invention herewith shown and described is to be taken as a preferred example of the same, and that various changes in the shape, size, and arrangement of parts may be resorted to without departing from the spirit of the invention or the scope of the subjoined claim.

Having thus described our invention, we claim:

In a pneumatic clutch, a shaft, a driving member loosely mounted on said shaft, a hub keyed to said shaft, a plate extending from said hub, pins secured to said plate and arranged substantially parallel to the axis of the shaft, a pair of disks movably mounted on said pins, an air bag arranged between said disks and adapted to retain them in spaced relation when air is admitted thereto, friction linings arranged on the outer faces of said disks, a casing carried by said driving member and surrounding said disks, and springs arranged on opposite sides of said disks to normally retain them in inoperative position.

In testimony whereof we affix our signatures.

HORACE F. SCRUBY.
CHARLES B. ROGERS.